Figure 1:
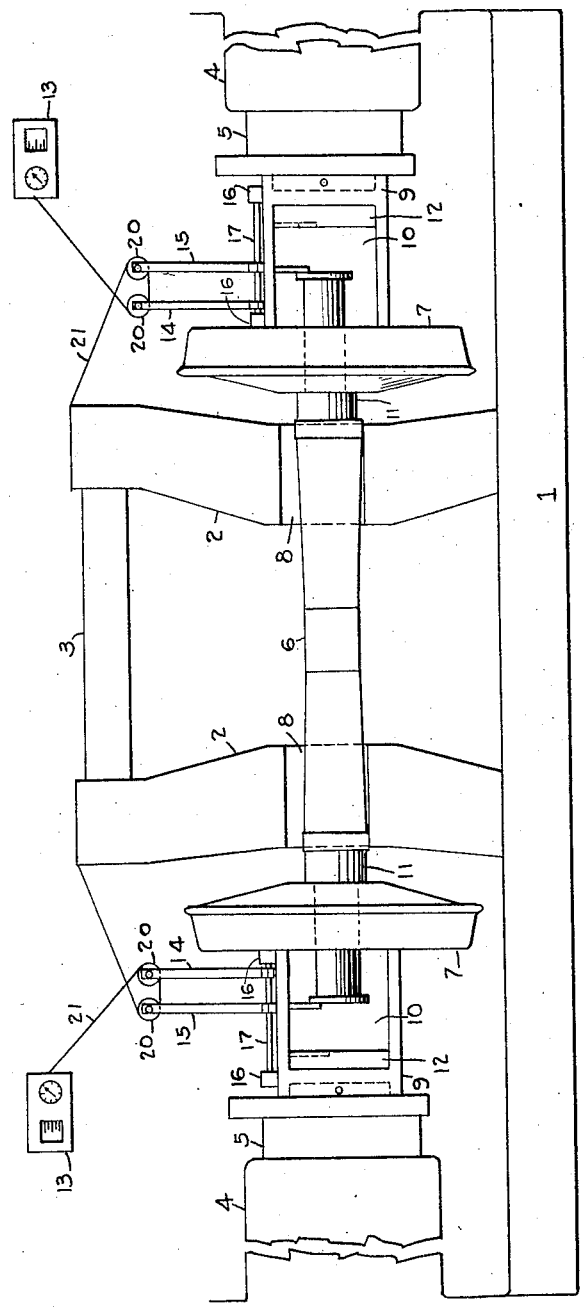
Figure 2:
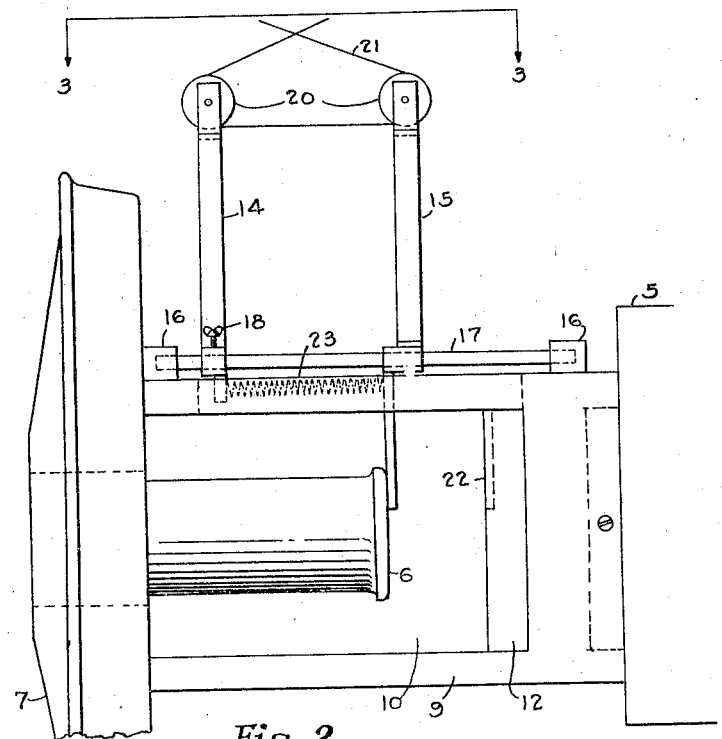
Figure 3:
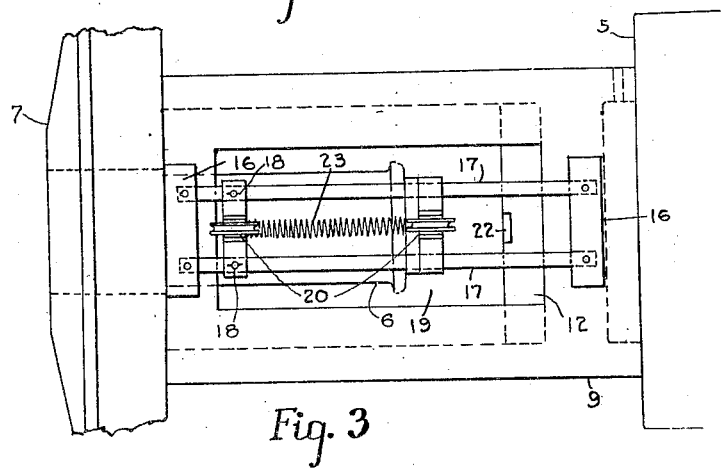

May 15, 1928. 1,669,559
R. G. HENLEY ET AL
INDICATING AND RECORDING DEVICE FOR PRESSES
Filed May 14, 1925 2 Sheets-Sheet 1

INVENTORS
RUSSEL. G. HENLEY.
BERNARD. COOK.
BY Isaac N. Moseley
THEIR ATTORNEY

May 15, 1928. 1,669,559
R. G. HENLEY ET AL
INDICATING AND RECORDING DEVICE FOR PRESSES
Filed May 14, 1925 2 Sheets-Sheet 2

INVENTORS
RUSSEL. G. HENLEY
BERNARD COOK

BY Isaac N. Moseley
THEIR ATTORNEY

Patented May 15, 1928.

1,669,559

UNITED STATES PATENT OFFICE.

RUSSELL G. HENLEY AND BERNARD COOK, OF ROANOKE, VIRGINIA.

INDICATING AND RECORDING DEVICE FOR PRESSES.

Application filed May 14, 1925. Serial No. 30,199.

This invention relates to the mounting of railway car wheels on an axle and has for its object to provide improved means for actuating a device which records the movement of the wheel on to the axle.

The method of securing railway car wheels to the axle they serve, is by means of a forced fit, the force with which the wheel grips the axle being proportional to the load necessary to force the wheel on. The amount of the load which is used in forcing the wheel onto its seat on the axle is therefore very important and must be kept within comparatively close limits. If the load used is too small, the wheel will work loose, while if it is too large, the material of which the wheel is made will be stretched beyond its elastic limit, thus causing its failure. Either of these conditions may result in a serious wreck with enormous loss of life and property.

Inasmuch as the amount of the load used in mounting the wheel is very important, it is desirable that means be provided whereby a record may be made of the load employed, and that this record show the amount of the load throughout the time the wheel is moving on to its seat. If the bore of the wheel or the seat on the axle is not the same diameter for their entire length the wheel will start on with a certain load, which will change as it moves on to its seat. When the bore of the wheel and the seat on the axle are correctly machined, the load necessary to force the wheel on will increase at a uniform rate as the wheel moves on to the axle.

There are on the market at present a number of devices which record the movement of the wheel on to the axle and show the load employed throughout its movement. These devices are well known in the art, and it is not necessary to enter into a description of them here, as our invention pertains to means for actuating these devices rather than to the devices themselves.

The present means for actuating these devices, which are controlled solely by the movement of the ram of the press, are satisfactory where a wheel is mounted on only one end of the axle at a time, the axle being held stationary by contact with the frame of the press. These present means, however, are not satisfactory when used with a double wheel press where a wheel is mounted on each end of an axle at the same time. In a double wheel press the axle is free to move relative to the frame of the press, and if the bore of each wheel is not exactly the same, or if the seat on each end of the axle is not of the same diameter, when the load is applied, one wheel will move onto its seat at a different rate of speed and with a different load from the other wheel. When these conditions exist, and they frequently do, the records made do not represent the actual pressure and movement, with relation to each other, as the wheel moves onto its seat, and are therefore of no value.

The object of this invention is to provide means for actuating the recording devices so that when used with a double wheel press they will record actual values of each wheel independent of the other, though they are mounted at the same time.

With this object in view, the invention consists of the formation, combination and arrangement of the various parts as set forth, particularly in the appended claims, the various elements being co-ordinated to produce improvements generally in this art.

In the drawings, Figure #1, is a fragmentary elevational view of a double wheel press with one embodiment of our invention mounted thereon.

Figure #2 is an enlarged elevational view of the shoe of the wheel press showing our invention in more detail.

Figure #3 is an enlarged plan of the shoe of the wheel press showing our invention in more detail.

The principal parts of the wheel press are the bed plate 1, having mounted thereon the standards 2 connected at the top by the rail 3. Mounted on the bed plate 1, also, are the cylinders 4 with their rams 5. The pumps for operating the rams 5 are not shown in the drawings, neither are the numerous details in the construction of the press, as these are well known in the art and have no direct connection with our invention.

The axle 6 with the wheels 7, which are to be mounted thereon, are placed in the press as shown in Figure #1, the axle occupying the recesses 8 in the standards 2. The recesses 8 being larger than the axle 6, permit the axle to move relative to the standards 2 and the bed plate 1. After the axle 6 and the wheels 7 have been placed in the press as shown, the pumps or other means for actuating the rams 5 are started and the rams move in toward the ends of the axle. The shoes 9, which are recessed at 10 to receive the end of the axle 6, are disposed between the rams 5 and the wheels 7, and are secured to the rams 5 by suitable means. As the rams 5 move in toward the ends of the axle 6 the wheels 7 will be forced on to the axle seats 11. The total amount of the movement of the wheels 7 on to the axle 6 is controlled by the thickness of the filler blocks 12. Different size axles have different lengths of wheel seats, and the thickness of the filler blocks 12 used are such as to give the desired total movement of the wheels on the axle.

It will be readily seen that as the load is applied to the wheels 7 through the shoes 9 that if the bore of each wheel and the diameter of the wheel seat on each end of the axle is exactly the same, both wheels 7 will move onto the axle 6 at the same rate of speed and there will be no tendency of the axle to move. With these conditions a record of the movement of the wheels 7 relative to the axle 6 made with a device actuated solely by the rams 5, would be a correct one.

However, these condtions do not exist nor are they necessary. What usually occurs is that the wheels 7 at each end of the axle 6 do not move onto the axle at the same rate of speed. And, on account of small variations in the bore of the wheels and in the wheel seats on the end of the axle, the load necessary to mount each wheel is not the same. Therefore, either wheel may move relative to the axle for a certain distance and then move with the axle relative to the other wheel, and to the frame of the press for a certain distance. Thus a recording device actuated solely by ram 5 will at times record the movement of one wheel with the axle relative to the other wheel and the press. A record so taken may show a certain movement at a certain pressure of a wheel relative to the axle, while in fact at the time the record was made the said wheel was moving with the axle relative to the other wheel and the record made is of no value.

In our invention we have provided means for actuating the recording devices whereby the record made represents the movement of the wheel relative to the axle irrespective of the movement of the axle relative to the frame of the press. The recording devices 13, which may be of any approved form, are mounted at suitable locations either on or off the frame of the press. The pressure or load, which is usually recorded in tons, exerted by the rams 5, is transferred to and recorded by the devices 13 in the usual manner. The movement of the wheels 7 relative to the axle 6 are transferred to and recorded by the devices 13 as follows: Mounted on the shoes 9, are two arms, one of which, 14, is adjustably fixed relative to the shoe 9, and the other, 15, which is free to move relative to the shoe 9. Permanently secured to the shoes 9 there are two supports 16, which position the guides 17. To these guides 17 are secured the fixed arm 14 and the movable arm 15. The fixed arm 14 is provided with suitable means 18 for clamping it at any desired location along the guides 17. The movable arm 15 is mounted that it is free to move along the guides 17 which are preferably of circular cross-section. The movable arm 15 extends down through an aperture 19 in the shoe 9, and is engaged by the end of the axle 6. Mounted in one end of the arms 14 and 15 are the grooved wheels or rollers 20 having associated therewith a flexible member 21, preferably a steel wire or cable, in such manner that the distance between the ends of the flexible member 21 is changed by movement of the movable arm 15 relative to the fixed arm 14. One end of the flexible member 21 is secured to some fixed part of the press and the other end to the recording device 13. The recording device 13 and the point at which the flexible member 21 is secured to the frame of the press may be so located with reference to the rollers 20, that all or any part of the movement of the wheel relative to the axle will be recorded by the device 13.

In mounting wheels on an axle of a certain size and having a definite length of wheel seat, the fixed arms 14 are so located on the guides 17 by the means 18 that when each wheel 7 is just beginning to move on to its seat on the axle, the lower end of the movable arms 15 will be in contact with the ends of the axle 6, and the devices 13 recording the movement of the wheels will be at zero. As the wheels move onto their seats the arms 14 and 15 move farther apart and the distance between the ends of the flexible members 21 are changed, and inasmuch as one end of the flexible members 21 is fixed, the recording device is actuated.

The filler blocks 12 are recessed at 22 so that the ends of the movable arms 15 will not interfere with the ends of the axle 6 coming in contact with the filler blocks, which contact limits the total movement of the wheels on the axle.

Should either wheel move with the axle relative to the other wheel, which does occur, the rollers 20 in the arms 14 and 15, which serve that wheel, will move along the flexible member 21, but will not change the distance between its ends and such movement will not be recorded by the recording device 13.

The recording devices 13, as above stated, may be of any approved form and they illustrate diagrammatically recording gauges of the type shown in U. S. Letters Patent No.

1,063,281, dated June 3, 1913, the chain F in which patent is, or is connected to, one, or each, of the flexible members 21 each member 21 operating a suitable paper roll such as is shown in said Patent 1,063,281, the marker to make the record on said paper being operated by such mechanism as is shown in said Patent 1,063,281 and being moved in accordance with the pressure of the ram, or rams, as is done in said patent, the devices 13 being mounted, as above stated, at suitable locations either on or off the frame of the press, an example of such mounting on the press being by the use of a member such as e' in said patent. When the movable arm 15 returns to normal position the member 21 will return to normal position, like the chain in said patent, so that a new record may be made for another mounting. The indicating hands shown in devices 13 are simply additions and have no necessary connection with the present invention. The devices 13 show the opening in the gauge casing and the lines on the paper corresponding with the opening l and the lines on the paper shown in said patent.

Attached to the fixed arm 14 and the movable arm 15 is the spring 23, which returns the movable arm 15 to its normal position, and allows the recording device to return to the zero reading when the axle and mounted wheels have been removed from the press.

We have thus provided adequate means of simple design, few parts and low cost whereby the movement of the wheel relative to the axle may be accurately recorded irrespective of the movement of the axle relative to the frame of the press.

We claim:

1. In combination with a ram for mounting wheels on an axle, devices for recording the movement of the wheels relative to the axle, means for actuating said recording devices comprising a flexible member, an arm fixed with relation to the ram and an arm movable with relation to the ram, said means being so arranged that the distance between the ends of said flexible member is changed by movement of said movable arm relative to said fixed arm.

2. In combination with a ram for mounting a wheel on each end of an axle at the same time, a device for recording the movement of each wheel relative to the axle, means for actuating said recording device, comprising a flexible member, an arm fixed with relation to the ram and an arm movable with relation to the ram, the said means being so arranged that movement of the wheel on the axle separates the said arms thereby decreasing the distance between the ends of said flexible member.

3. In combination with a press for mounting a wheel on each end of an axle at the same time, a device for recording the movement of each wheel relative to the axle, means for actuating said recording device comprising a flexible member having one end attached to the frame of the press and the other end attached to the recording device, two arms attached to the shoe of the press, one arm being fixed with relation to the shoe and the other being movable with relation to the shoe, means for adjusting the location of the fixed arm, additional means for guiding the movement of the movable arm, the said movable arm being actuated by the axle whereby the movement of the wheel on the axle separates the said arms and decreases the distance between the ends of said flexible member.

4. In combination with a double wheel press, devices for recording the movement of each wheel relative to the axle, means for actuating said recording devices comprising a flexible member, an arm fixed with relation to the press and an arm movable with relation to the press, the said means being so arranged that an increase in the distance between the said fixed arm and the said movable arm decreases the distance between the ends of said flexible member.

5. In combination with a double wheel press, devices for recording the movement of each wheel relative to the axle, means for actuating said recording devices comprising a flexible member, an arm fixed with relation to the press and an arm movable with relation to the press, the said means being so arranged that an increase in the distance between the said fixed arm and the said movable arm, decreases the distance between the ends of said flexible member, additional means for returning the said movable arm to its normal position after the wheel has been mounted on the axle.

6. In combination with a double wheel press having a shoe and a filler block for said shoe, devices for recording the movement of each wheel relative to the axle, means for actuating said recording devices comprising a flexible member, an arm fixed with relation to the press and an arm movable with relation to the press, the said means being so arranged that an increase in the distance between the said arms decreases the distance between the ends of the said flexible member, the said fixed arm being adjustably secured to the shoe of the press, the said movable arm being mounted to slide on the shoe of the press, and actuated by the axle, the filler block of the shoe being adapted to receive the end of said movable arm.

7. A device of the character described comprising means for mounting a wheel on an axle; means for recording the movement of said wheel relative to said axle; and two members, one operatively connected with the axle and the other with the wheel and movable relatively to each other only when the wheel and axle move relatively to each other; and means connecting said members, said connecting means being actuated by relative movement between said members and actuating said recording means.

8. A device of the character described comprising means for mounting a wheel on an axle; means for recording the movement of said wheel relative to said axle; and two members, carried by the mounting means, one operatively connected with the axle and the other with the wheel and movable relatively to each other only when the wheel and axle move relatively to each other; and means connecting said members, said connecting means being actuated by relative movement between said members and actuating said recording means.

9. In combination with a press for mounting a wheel on an axle, means for recording the movement of the wheel relative to the axle, means for actuating said recording means including a flexible member, a member fixed with relation to the press and a member movable with relation to the press, said actuating means being so arranged that the distance between the ends of the flexible member is changed by movement of said movable member relative to said fixed member.

10. A device of the character described comprising means for mounting a plurality of wheels on an axle; means for recording the movement of said wheels relative to said axle; and means for actuating the recording means including a member operatively engaging the axle and another member movable with relation to the first member but, during operation, immovable with relation to one of the wheels of said plurality and including a third member operatively engaging said axle and a fourth member movable with relation to the third member but, during operation, immovable with relation to another of the wheels of said plurality.

11. A device of the character described comprising means for mounting two wheels on an axle; means for recording the movement of one of said wheels relative to the axle; means for recording the movement of the other of said wheels relative to the axle; two members, one operatively connected with the axle and the other with one of said wheels and movable relatively to each other only when said one wheel and said axle move relatively to each other, said members, when moved relatively to each other, actuating the first-mentioned recording means; and two other members, one operatively connected with the axle and the other with the other of said wheels and movable relatively to each other only when said other wheel and said axle move relatively to each other, said two other members, when moved relatively to each other, actuating the second-mentioned recording means.

12. In combination with a press for mounting wheels on an axle; means for recording the movement of the wheels relative to the axle; relatively-movable means actuated by the wheel and axle and movable relatively only when the wheel and axle move relatively to each other; and means connecting the relatively-movable means with the recording means to actuate the latter when said relative movement occurs.

13. In combination with a press for mounting a wheel on each end of an axle at the same time; means for recording the movement of the wheel relative to the axle; relatively-movable means actuated by one wheel and the axle and movable relatively only when said one wheel and the axle move relatively to each other; means connecting said relatively-movable means with the recording means to actuate the latter when said relative movement occurs; other relatively-movable means actuated by the other wheel and the axle and movable relatively only when said other wheel and axle move relatively to each other; and means connecting said other relatively-movable means with the recording means to actuate the latter when the relative movement of said other relatively-movable means occurs.

14. In combination with a frame; a press carried by said frame for mounting a wheel on each end of an axle at the same time; means for recording the movement of one of said wheels relative to the axle; other means for recording the movement of the other of said wheels relative to the axle; relatively-movable means actuated by one wheel and the axle and movable relatively only when said one wheel and the axle move relatively to each other; means connecting said relatively-movable means with the first-mentioned recording means to actuate the latter when said relative movement occurs; other relatively-movable means actuated by the other wheel and the axle and movable relatively only when said other wheel and axle move relatively to each other; and means connecting said other relatively-movable means with said other recording means to actuate the latter when the relative movement of said other relatively-movable means occurs, said wheels and said axle being free to move relative to the frame.

15. In combination with a press for mounting a wheel on each end of an axle at the same time, said press including two shoes, one for each of said wheels, a device for recording the movement of each wheel relative to the axle, means for actuating said recording device comprising a flexible member attached to the frame of the press and to the recording device, an arm fixed with relation to one of said shoes and an arm movable with relation to said one shoe, said shoe carrying said arms; another arm fixed with relation to the other of said shoes and another arm movable with relation to the other of said shoes, said other arms being carried by said other shoe, the said movable arms being so arranged that the ends of the axle separate the movable arms from the fixed arms as the wheels move on the axle, the separation of each fixed arm and its cooperating movable arm decreasing the distance between the ends of said flexible member.

16. An indicating device for a press comprising recording means; a member fixed with relation to the press and a member movable with relation to the press; and means connecting said members, said connecting means being actuated by relative movement between said members and actuating said recording means.

17. A device of the character described comprising means for mounting an element on an axle; means for recording the movement of said element relative to said axle; and two members, one operatively connected with the axle and the other with said element and movable relatively to each other only when said element and the axle move relatively to each other; and means connecting said members, said connecting means being actuated by relative movement between said members and actuating said recording means.

18. A device of the character described comprising means for mounting a wheel on an axle; two members, one operatively connected with the axle and the other with the wheel and movable relatively to each other only when the wheel and axle move relatively to each other; a recording gauge; and means connecting said members and operatively connected with said recording gauge, said connecting means being actuated by the relative movement of said members relatively to each other to operate said gauge.

19. An indicating device for a press comprising a member fixed with relation to the press; a member movable with relation to the press; a recording gauge; and means connecting said members and operatively connected with said recording gauge, said connecting means being actuated by the relative movement of said members relatively to each other to operate said gauge.

20. A device of the character described comprising means for mounting a plurality of elements on a shaft; means for recording the movement of said elements relative to said shaft; and means for actuating the recording means including a member operatively engaging the shaft and another member movable with relation to the first member but, during operation, immovable with relation to one of the elements of said plurality and including a third member operatively engaging said shaft and a fourth member movable with relation to the third member, but, during operation, immovable with relation to another of the elements of said plurality.

RUSSELL G. HENLEY.
BERNARD COOK.